Dec. 3, 1968    R. J. KRAUSHAAR    3,413,847
VOLUME MEASURING SYSTEM
Filed July 22, 1965
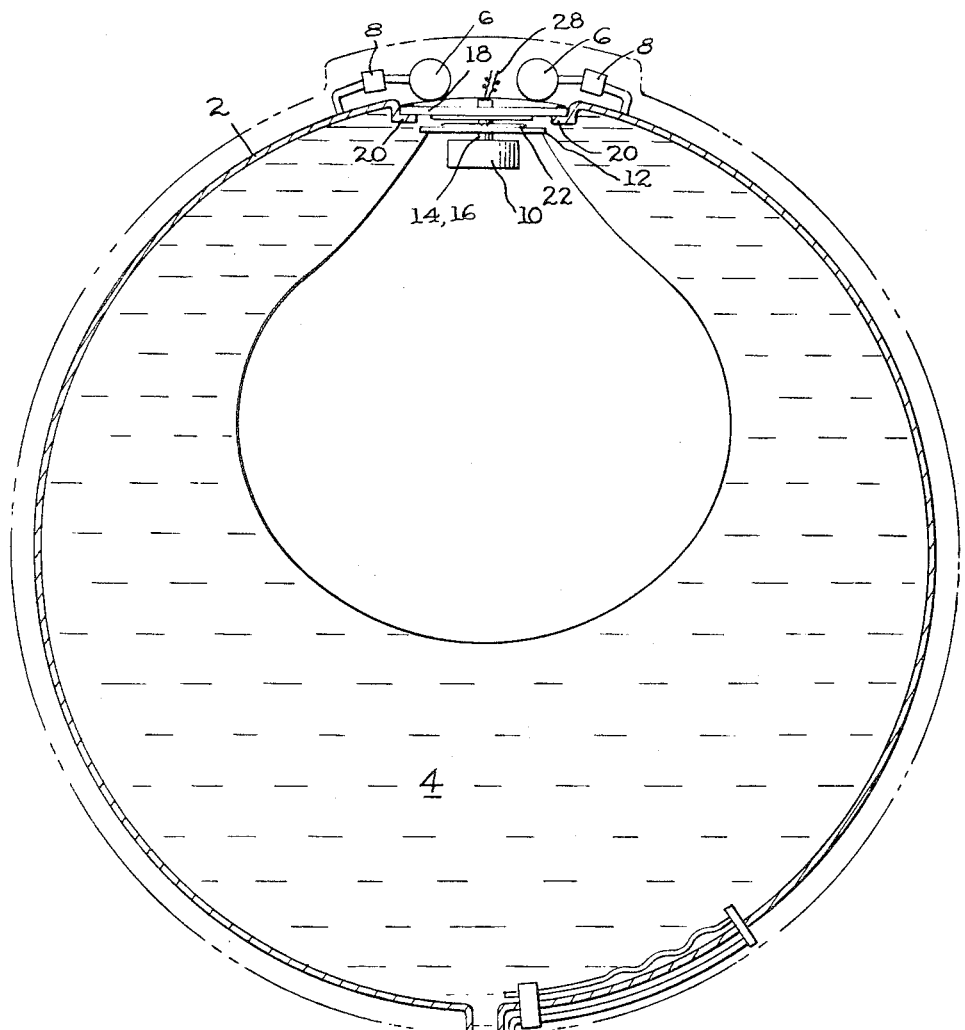
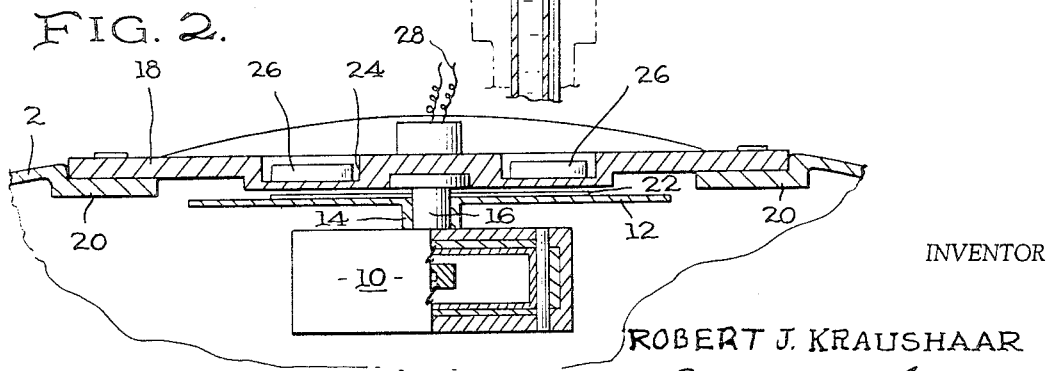
INVENTOR
ROBERT J. KRAUSHAAR
BY
ATTORNEY

United States Patent Office 3,413,847
Patented Dec. 3, 1968

---

3,413,847
VOLUME MEASURING SYSTEM
Robert J. Kraushaar, Tenafly, N.J., assignor to Simmonds Precision Products, Inc., Tarrytown, N.Y., a corporation of New York
Filed July 22, 1965, Ser. No. 474,077
4 Claims. (Cl. 73—149)

---

ABSTRACT OF THE DISCLOSURE

A liquid gauging system for a container of liquid operating under zero gravitational conditions wherein the container includes a vapor space in which a trace gas is injected for subsequent density measurement and hence gas volume and liquid mass. The vapor space envelops a gas detector by means of a vortex creating impeller means rotatably mounted on the gas detector.

---

This invention relates to liquid gauging systems and, more particularly to liquid gauging systems operating under zero gravitational conditions. Specifically, this invention contemplates the injection of a measured quantity of trace gas into a tank vapor space wherein subsequent selective measurement of the trace gas density gives an accurate measure of gas volume and hence liquid mass.

As described in U.S. patent application Ser. No. 406,996, filed by Harrison F. Edwards, on Oct. 28, 1964, assigned to the same assignee as this application, the system for the operation of this invention comprises a closed tank partly filled with a fluid and having a gas ullage space thereabove. By measuring the density of a known mass of trace gas introduced into the ullage space, one can determine the volume of the ullage space, the volume of the gas enclosed in the ullage space as well as the volume of the fluid contained in the tank. Projecting into the tank and in contact with the ullage space is a gas detector means for measuring the density of the trace gas introduced into the ullage space. Under gravitational conditions the ullage space will orient itself at the top of the tank opposite to the outlet for the liquid volume at the lower portion of the tank, and hence the detector means for such systems need only be positioned at the top of the tank. Under zero gravitational conditions, however, it is necessary to provide constant communication between the gas density measuring device and the vapor or ullage gas volume within the tank. Normally, under zero or extremely low gravity conditions the liquid within the tank will lie adjacent the tank walls and, in accordance with the principle of minimum surface energy, the ullage gas will collect in a single sphere which will tend to center itself in the tank in the absence of external disturbances. It is desirable, therefore, to locate this ullage gas sphere in a position where it will continually envelop the detector assemblies.

Accordingly, it is an objective of this invention to provide fluid measurement in a fluid containing tank which is entirely independent of fluid position within the tank.

Accordingly, it is an object of this invention to provide vaporous phase orientation in a closed tank under zero gravity conditions.

It is another object of this invention to provide a vortex generator device within a closed tank for positioning a vapor or ullage space in a selective location within the tank.

Other objects and advantages will become apparent from the following description taken in conjunction with the accompanying drawing in which:

FIG. 1 is an elevational view of a closed liquid tank equipped with the vortex generator according to this invention; and FIG. 2 is an enlarged view of the vortex generator structure.

Referring now to FIG. 1, a closed liquid tank 2 containing a supply of liquid 4 therein is equipped with two trace gas high-pressure containers 6 each having a squib-type valve 8 for control or metered flow into the tank 2. The tank is assumed to be a simple continuous shape, such as a sphere, cylinder, ellipsoid or simple combinations or modifications of these shapes. In general, none of these shapes causes a particular problem for the systems under consideration.

Inside the tank located adjacent the wall surface thereof is a detector head assembly 10 which measures the density of the trace gas injected into the tank. It has been found that helium 3 offers excellent results as a trace gas and further that the gas detection device comprise a neutron absorption system. The trace gas and detector assembly, however, do not form a part of this invention since they form the subject matter of another application to be concurrently filed with this application. Adjacent the detector assembly is located a disk 12 termed a vortex generator according to the principles of this invention. The disk 12 has a central bushing 14 rotatably mounted on a pinion 16 suitably secured to a mounting flange 18 which is welded or secured by suitable means to an aperture defining lip 20 on the tank 2.

The disk 12 has a magnetic coating 22 on one side thereof facing the mounting flange 18. Positioned in recesses 24 on flange 18 are magnetic driving coil assemblys 26 having appropriate electrical leads 28 for cooperating with the magnetically coated disk 12 to form a magnetic coupling therebetween. As a result the disk 12 is rotated thus creating a vortex within the tank 2 in which the gas volume or ullage space migrates toward the rotating disk 12 and is constrained to remain in an area surrounding the gas detector device as will be subsequently explained.

The disk rotation will set up rotational motion in the fluid which will in a short time result in the formation of a vortex. If the rotational velocity of the disk is sufficiently small, the entire disk diameter becomes the core of the vortex as shown in FIG. 1. If the disk rotates such that its periphery moves in excess of a predetermined critical velocity, a slippage will occur and a boundary layer is formed from the disk radius into a smaller radius with the corresponding critical velocity. The value of this velocity is subject to the boundary conditions imposed by the proximity of the tank wall to the viscosity of the fluid and to the amount of tension the fluid is capable of supporting. Beyond this critical velocity trajectory a shear region is observed. Fluid is pumped off the edge of the disk and the fluid increments acquire a radial component of velocity. The fluid path then is that of a pair of toroidal helices osculating at the plane of rotation of the disk. The fluid excursion near the axis of the disk is toward the disk and near the external boundary is away from the disk. Such excessive rotational velocities as would produce cavitation are of no concern here. From experimentally observed facts, it has been found that a pressure minimum exists at the axis of and on the surface of the disk 12 and a similar minimum pressure region occurs again on the axis of the rotating disk. A free surface (gas-liquid interface) within the enclosed volume will be distorted and provided the liquid wets the container wall, the parcel of gas will migrate to the disk under the action of the differential pressure. The movement under zero gravitational conditions is governed only by these low induced forces and by the inertial character of the relative densities of the gas and liquid.

If the shape of the gas volume which during its migration is determined primarily by the surface tension forces is asymmetrically positioned in the tank, the rotating fluid which is of higher density will seek the outer boundary wall surface forcing the gas volume to the axis. When the gas finally reaches the surface of the disk it will not spread over the surface of the disk if the rotational velocity is sufficiently low. A particular velocity is then chosen such that the centrifugal acceleration of force imparted by the disk to the liquid balances the surface tension forces in the solid-liquid, solid-gas, liquid-gas interfaces and the fluid flow forces at some given radius of the disk.

The trace gas detector is shown located at a point opposite the tank outlet. This ensures exposure to the vapor space during engine thrust conditions while the vortex generator immediately above the detector assembly will insure that the vapor bubble will envelop the detector under zero or low gravity conditions. Power consumption for the vortex generator is estimated less than 0.3 watt.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

I claim:

1. In a tank containing a liquid volume and a gas volume, a gas volume positioning assembly comprising a disk rotatably mounted on the inside surface of said tank, means mounted on said tank for imparting a given rotational velocity to said disk, a gas detector means mounted adjacent said disk on the rotational axis thereof whereby said gas detector means is completely enveloped by said gas volume forming a vortex about said disk.

2. In a tank filled with a liquid volume and a gas volume, a gas positioning assembly comprising a disk rotatably mounted to the inside surface wall of said tank and spaced therefrom, a magnetic coating on the surface of said disk facing said tank wall, magnetic coil means mounted on the outside surface of said tank wall adjacent said disk for imparting a given rotational velocity to said disk, gas detection means positioned adjacent said disk on the rotational axis thereof whereby said detector means is completely enveloped by said gas volume forming a vortex about said disk.

3. In a tank having a liquid volume and a gas volume, a gas detection means located within said tank, and impeller means rotatably mounted on said gas detection means for establishing a gas volume vortex about said gas detection means.

4. In a tank having a liquid volume and a gas volume, a gas positioning assembly comprising a rotatable magnetic member mounted on the inside surface wall of said tank, magnetic means mounted on the outside wall of said tank for imparting a given rotational velocity to said member and gas detection means located adjacent said member whereby said gas volume completely envelopes said gas detection means by forming a vortex about said rotatable member.

References Cited

UNITED STATES PATENTS

| | | | |
|---|---|---|---|
| 2,106,574 | 1/1938 | Moore | 73—290 |
| 2,344,898 | 3/1944 | Rathbun | 55—270 XR |
| 2,359,927 | 10/1944 | Melas | 73—229 |
| 3,240,002 | 3/1966 | O'Rourke | 55—400 |

S. CLEMENT SWISHER, *Acting Primary Examiner.*

J. NOLTON, *Assistant Examiner.*